R. N. DIKE.
SPRING DOUBLETREE.
APPLICATION FILED OCT. 8, 1913.
1,088,014.
Patented Feb. 24, 1914.
2 SHEETS—SHEET 1.
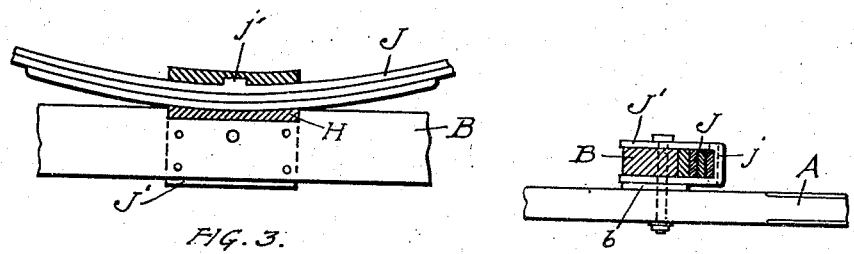
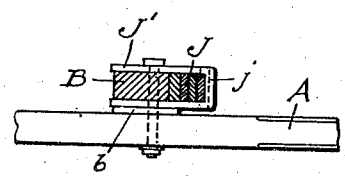
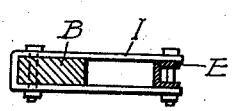
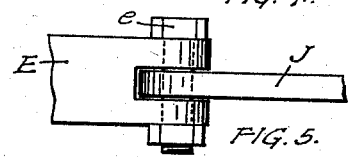
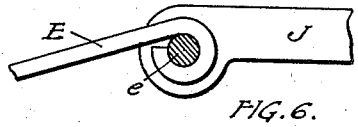
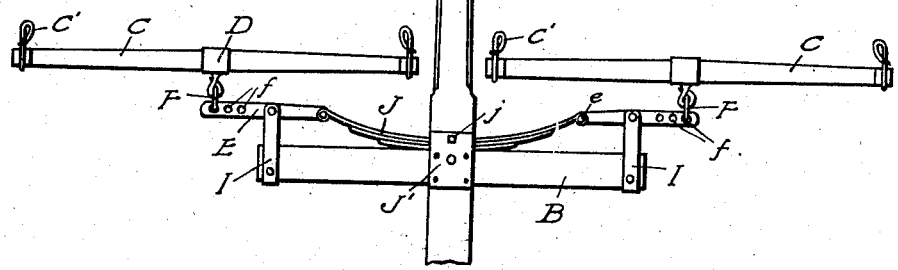
WITNESSES:
A. B. Cornelius
Emma Heckel.
INVENTOR:
Roy N. Dike
BY Eugene Ayres,
ATTORNEY.

R. N. DIKE.
SPRING DOUBLETREE.
APPLICATION FILED OCT. 8, 1913.

1,088,014.

Patented Feb. 24, 1914.
2 SHEETS—SHEET 2.

WITNESSES:
A. B. Cornelius
Emma Heckel.

INVENTOR:
Roy N. Dike
BY Eugene Ayres,
ATTORNEY.

UNITED STATES PATENT OFFICE.

ROY N. DIKE, OF ST. JOSEPH, MISSOURI.

SPRING-DOUBLETREE.

1,088,014.  Specification of Letters Patent.  Patented Feb. 24, 1914.

Application filed October 8, 1913. Serial No. 794,133.

*To all whom it may concern:*

Be it known that I, ROY N. DIKE, a citizen of the United States of America, residing at St. Joseph, in the county of Buchanan and State of Missouri, have invented certain new and useful Improvements in Spring-Doubletrees, of which the following is a specification.

My object is to provide a double-tree with a spring attachment that will save the horses from being worn and injured by sudden stops when a wheel of a wagon strikes or drops into a hole or rut thereby stopping the wagon suddenly, causing a sudden jerk and strain on the shoulders of the horse, which strain is repeated when the horse again starts forward to pull the wheel out of the hole or rut. I overcome this by the attachment of a spring which, when the wheel drops into a hole or rut, gives, and relieves the horse's shoulders from a sudden jolt or jerk; and, when the horse starts on, the spring gives at the first pull of the horse relieving the horse from the strain, which ordinarily occurs under the circumstances described, and enables the horse to go on without unnecessary strain.

I accomplish my object by the mechanism illustrated in the accompanying drawings, in which—

Figure 7:
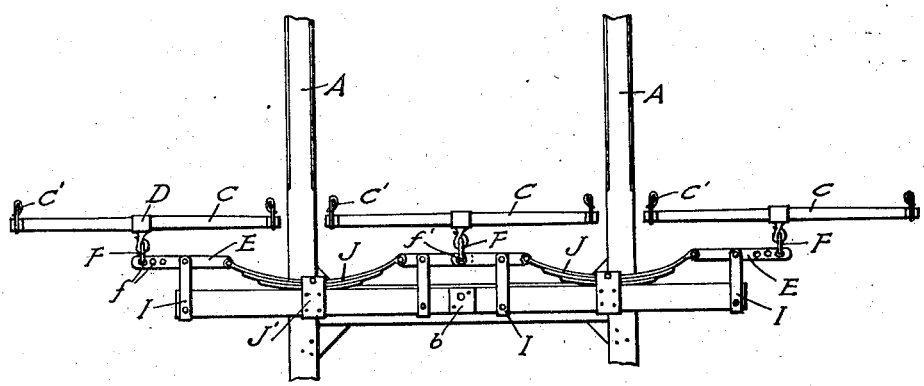
Figure 8:
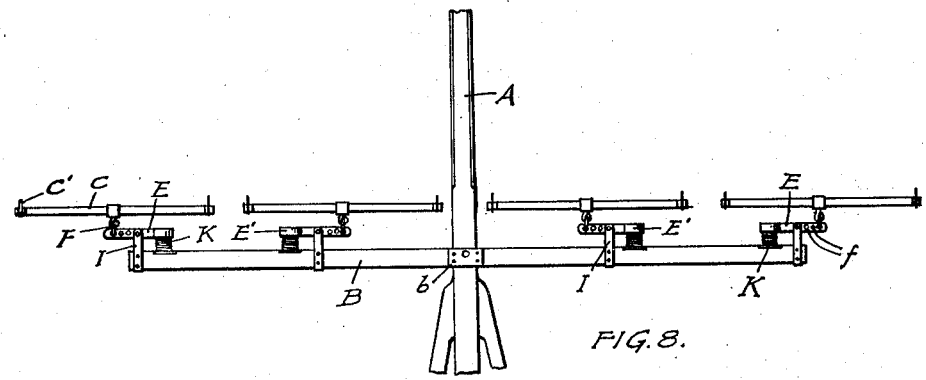
Figure 9:
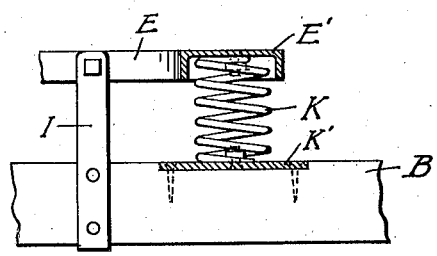

Figure 1 is a top view of the tongue of a wagon, and a double-tree with a flat spring attached, and two spring-trees each connected with the double-tree, an end of the flat spring and a swingle-tree; Fig. 2 is a cross section of the double-tree, showing a clevis and spring-tree; Fig. 3 is an enlarged detail view of the flat spring, showing the manner of securing the same to the double-tree; Fig. 4 is a sectional view of Fig. 3; Fig. 5 is a detail of a joint of a spring-tree and spring; Fig. 6 is a top view of Fig. 5; Fig. 7 is a top view showing the combination of three swingle-trees attached to a double-tree provided with flat springs; Fig. 8 is a top view showing the combination of four swingle-trees attached to a double-tree with spiral springs, and Fig. 9 is a detail of said spiral spring showing the manner of securing the same to the double-tree and in a channel in the end of a spring-tree.

Similar letters refer throughout the several views to corresponding parts.

A represents the tongue of a wagon.

B is the double-tree of a wagon which is constructed of lengths adapted for use with two, three or four swingle-trees C C— having hooks C' C' to engage with tugs, as shown in Figs. 1, 7 and 8. It may also be made a length adapted to one swingle-tree only.

D is a hook and F is a clevis forming connection between a swingle-tree C and a spring-tree E. I I are flat clevises connected at one end with bolts in said spring-trees and at the other end connected with the double-tree.

*f f*— are holes in the spring-tree by which the swingle-tree may be regulated for heavier or lighter draft.

As shown in Fig. 7, the center swingle-tree is connected with the spring-tree E by means of a bolt *f'* working pivotally to enable the middle horse to work on both of the oppositely placed flat springs J J.

H is a flat piece of iron gained into the double-tree to prevent wear, as shown in Fig. 3. Said springs are attached to the double-tree, preferably, by iron clamps J' J' which grasp around the spring and double-tree; said clamps each have a hole *j*, as shown by dotted lines in Fig. 4, to receive a lug *j'*, welded on the spring, as shown in detail in Fig. 3. The spring is fastened to the spring-tree by a bolt *e*, as shown in Figs. 5 and 6.

*b* is a plate on the double-tree to receive a bolt and prevent wear, as shown in Figs. 7 and 8.

K is a spiral spring, shown in Fig. 8 and in detail by Fig. 9; this spring may be substituted for the flat spring, if preferred. Said spiral spring is held in place at the bottom by a plate K' of iron or steel which is screwed to the double-tree, the spring being bolted on plate K' as shown in Fig. 9. Spring-tree E is provided with a channel E' in which the top of the spring is bolted, as shown in detail in said Fig. 9.

In the foregoing description and in the drawings I have shown two forms of springs,—a flat spring and a spiral spring. Either form may be used each accomplishing the same purpose and the form in itself of neither being novel. I desire to reserve to myself the right in manufacturing my device to make any other changes in construction that are not inventive but merely mechanical.

What I claim and desire to secure by Letters Patent, is:—

1. The combination of a double-tree, two of more swingle-trees forward thereof, short spring-trees equi-distant between said double and swingle-trees having spring and flat clevis connection with the double-tree and hook and clevis connection with the swingle-trees.

2. The connecting means between a straight double-tree and a straight swingle-tree comprising a straight spring-tree midway between the double-tree and swingle-tree, one end of said spring-tree having a plurality of holes to render the same adjustable, a clevis and hook on said swingle-tree to engage with said holes, a spring at the other end of said spring-tree said spring being seated on the front of said double-tree and a flat straight clevis forming connection between said double-tree and the central part of said spring-tree.

In testimony whereof I affix my signature in presence of two witnesses.

ROY N. DIKE.

Witnesses:
CHAS. DE BRINE,
E. F. HARTZELL.

Copies of this patent may be obtained for five cents each, by addressing the "Commissioner of Patents, Washington, D. C."